April 27, 1948.   H. E. HAHN, JR   2,440,655
DOUGH FORMING MACHINE
Filed Feb. 28, 1945   2 Sheets-Sheet 1

INVENTOR.
HENRY E. HAHN JR.
BY Gerald P. Welch
ATTORNEY

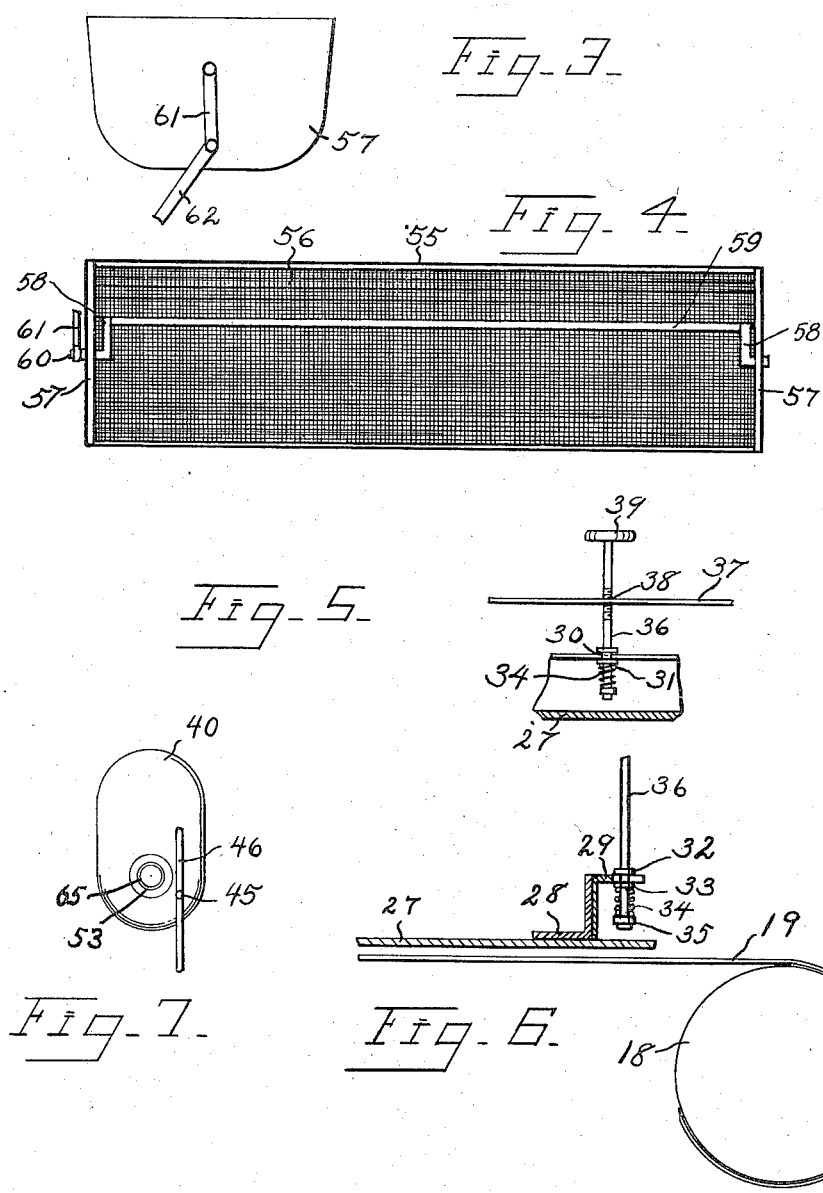

Patented Apr. 27, 1948

2,440,655

UNITED STATES PATENT OFFICE 2,440,655

DOUGH FORMING MACHINE

Henry E. Hahn, Jr., Milwaukee, Wis., assignor to Hahn Baking Company, Milwaukee, Wis.

Application February 28, 1945, Serial No. 580,091

1 Claim. (Cl. 107—7)

This invention relates to improvements in dough forming machines and more particularly to a novel device for the prebaking forming of crullers or stick doughnuts.

An object of the invention is to provide a device of the type which will accurately form the dough elements adapted for the baking of crullers without the use of dies now present in devices of the type in present-day use.

Another object of the invention is to provide a device which is capable of varying the size and shape of said elements, which is not possible with the die equipped machinery.

Another object of the invention is to provide simple and efficient means for the dusting of flour on the elements in the forming process.

Other and further objects of the invention will be apparent as the description proceeds, reference being had to the accompanying drawings, in which:

Fig. 3 is an end view of one of the flour sifting devices.

Fig. 4 is a plan view of the same.

Fig. 5 is a front fragmentary view of one of the leveling boards and the adjustment control therefor, partly in section and partly in elevation.

Fig. 6 is a side detail fragmentary view of the control link and leveling board, together with a portion of the canvas belt and one of the drums mounting the same.

Fig. 7 is a detail front view of the dough extruding device and the rotatable dough cutter element.

Figure 1:
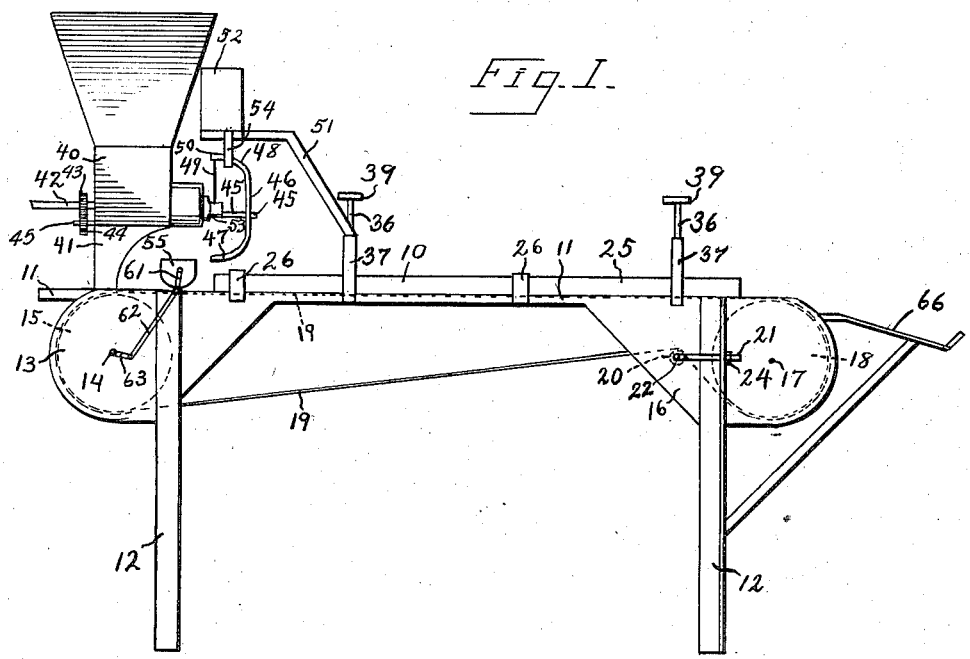
Fig. 1 is a side view of a dough forming machine embodying my invention.
Figure 2:
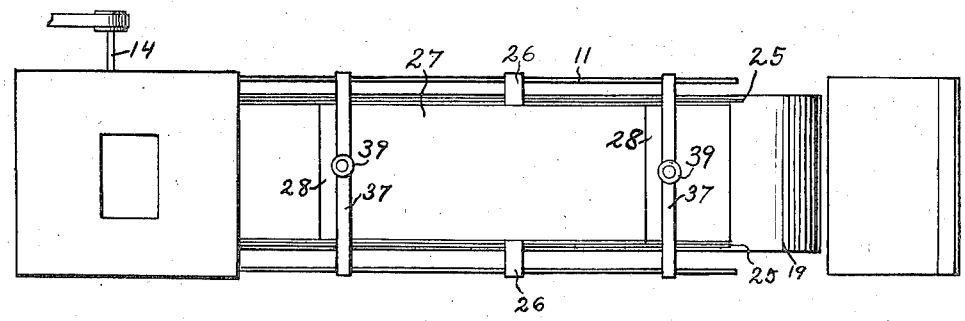
Fig. 2 is a plan view of the same.

Referring more particularly to the drawings, the number 10 refers to the device generally, having a frame 11 having supporting legs 12. Rear shield members 13 journal the axle 14 on which is mounted the drum 15. Front shield members 16 journal the axle 17 carrying the drum member 18. A canvas belt 19 is carried about the said drums 15 and 18 and the tightener roll 20. The front legs 12 carry the tightener rods 21 the inner ends of which 22 journal the roll 20, and which are provided at their outer ends 23 with the threaded tightening means 24. A pair of guides 25 are fastened to the frame 11 by the brackets 26 and are disposed parallel to and adjacent the side edges of the belt 19 and constitute a side guard for the leveling board 27. The board 27 is held above and away from the belt 19 by the transverse angle irons 28 which are secured to the reversed angle irons 29 which latter are notched centrally at 30 to receive the flexible coupling 31 comprised of rings 32 and 33, the spring 34 and nut 35 on the vertically adjustable rods 36 threaded in the supports 37 at 38 thereof and operable by the handles 39.

A dough extruding device 40 is mounted on frame 11 by means of the bracket 41, and may be of any convenient type, and is actuated by the power shaft 42 operated by suitable motor means. A gear 43 on shaft 42 operates a gear 44 on shaft 45 which operates the rotatable cutter element 46 having a pair of arcuate arms 47 and 48, and a cutter wire 49 connecting the end 50 of arm 48 with the shaft 45.

A bracket 51 fixed above the rear support 37 holds a flour sifter 52 above the orifice at 53 of the extrusion device 40. A spring element 54 is affixed to the bottom of the sifter 52 and protrudes into the path of the arms 47 and 48 on the cutter element 46.

An apparatus for sifting flour on the surface of the belt 19 comprises a stationary screen receptacle 55, having a one-piece bottom and sides of the screen 56 and the end plates 57, in which are journaled the cranks 58 connected by an agitator rod 59. The axle 60 of one of the cranks 58 is fixed to the outside crank 61, which latter is coupled by means of the connecting rod 62 to the crank 63 fixed to the axle 14.

In operation, the same motor which actuates the shaft 42 operates the axle 14 mounting the drum 15. As the dough 65 is extruded from the orifice at 53 the rotating wire 49 severs small portions thereof, and the arms 47 and 48 impinging against the spring element 54 will precipitate intermittently small portions of flour on said portions as they fall on the belt 19 to be carried toward and under the shaping or leveling board 27. The handles 39 are adjusted to hold said board at the desired height, and the portions of dough will acquire a cylindrical form especially adapting them to be baked as crullers. As they pass over the drum 18 on belt 19 the said cylindrical dough portions will be discharged onto the tray member 66, from which they may be appropriated for the baking operation.

Having thus described my invention, it will be understood that the device is capable of many modifications in structure and design, without departing from the spirit of the invention, within the scope of the appended claim.

What I claim and desire to secure by Letters Patent of the United States, is:

In a device of the character described, means for extruding dough in continuous cylindrical form, a rotatable shaft adjacent said extrusion means, an arcuate member centrally fixed on said shaft, a wire cutter element extended from one end of said arcuate member to said shaft for intermittently cutting through said extruded dough, a flour sifter mounted above said extrusion means, and a yieldable member on said flour sifter in the path of the rotating ends of said arcuate member operable to sift some of the flour with each contact of said parts.

HENRY E. HAHN, Jr.

REFERENCES CITED

The following references are of record in the file of this patent:

UNITED STATES PATENTS

| Number | Name | Date |
|---|---|---|
| 730,104 | Ferguson | June 2, 1903 |
| 771,560 | Meurell | Oct. 4, 1904 |
| 923,360 | Kruse et al. | June 1, 1909 |

FOREIGN PATENTS

| Number | Country | Date |
|---|---|---|
| 22,725/35 | Australia | May 22, 1935 |